(12) United States Patent
Matsumoto

(10) Patent No.: US 7,359,599 B2
(45) Date of Patent: Apr. 15, 2008

(54) OPTICAL NEAR-FIELD GENERATOR AND NEAR-FIELD OPTICAL RECORDING AND REPRODUCTION APPARATUS

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/733,258

(22) Filed: Apr. 10, 2007

(65) Prior Publication Data

US 2007/0242921 A1    Oct. 18, 2007

(30) Foreign Application Priority Data

Apr. 12, 2006  (JP) .............................. 2006-109389

(51) Int. Cl.
G02B 6/42 (2006.01)
G02B 6/30 (2006.01)
G02F 1/295 (2006.01)

(52) U.S. Cl. ............................... 385/47; 385/49; 385/9

(58) Field of Classification Search ................... 385/9, 385/47, 49
See application file for complete search history.

(56) References Cited

U.S. PATENT DOCUMENTS

| | | | | |
|---|---|---|---|---|
| 5,453,837 A * | 9/1995 | Naqwi et al. ............... 356/485 |
| 6,376,827 B1 * | 4/2002 | Kasama et al. ............. 250/216 |
| 6,408,123 B1 * | 6/2002 | Kuroda et al. .............. 385/130 |
| 6,580,677 B1 * | 6/2003 | Chiba et al. ................ 369/126 |
| 7,187,441 B1 * | 3/2007 | Sevick-Muraca et al. ... 356/336 |
| 2004/0085862 A1 | 5/2004 | Matsumoto et al. |
| 2005/0175273 A1 * | 8/2005 | Iida et al. ..................... 385/15 |
| 2005/0226636 A1 * | 10/2005 | Hiramatsu et al. .......... 398/182 |

OTHER PUBLICATIONS

H. Saga, et al., "New Recording Method Combining Thermo-Magnetic Writing and Flux Detection", Japan Journal Appl. Phys., vol. 38, pp. 1839-1840, Mar. 1999.
T.Matsumoto, et al., "An Efficient Probe with a Planar Metallic Pattern for High-Density Near-Field Optical Memory", Technical Digest of 6th International Conference on Near Field Optics and Related Techniques, the Netherlands, Aug. 27-31, 2000, p. 55.

* cited by examiner

Primary Examiner—K. Cyrus Kianni
(74) Attorney, Agent, or Firm—Antonelli, Terry, Stout & Kraus, LLP.

(57) ABSTRACT

Decrease in optical near-field intensity is prevented when an light propagating medium made of a high refractive index material, such as a waveguide or a lens, is combined with a scatterer for producing optical near-field. Near the optical near-field generating element, a second light propagating medium is disposed in contact with a first light propagating medium of a high refractive index material, such as a waveguide or a lens. The refractive index of the second light propagating medium is made smaller than the refractive index of the first light propagating medium.

6 Claims, 10 Drawing Sheets

OPTICAL NEAR-FIELD GENERATOR AND NEAR-FIELD OPTICAL RECORDING AND REPRODUCTION APPARATUS

CLAIM OF PRIORITY

The present application claims priority from Japanese application JP2006-109389 filed on Apr. 12, 2006, the content of which is hereby incorporated by reference into this application.

BACKGROUND OF THE INVENTION

1. Field of the Invention

The present invention relates to a optical near-field generator and a near-field optical recording and reproduction apparatus having a optical near-field generator mounted in a head thereof.

2. Background Art

In recent years, a thermally assisted magnetic recording has been proposed as a means of realizing high recording densities of 1 Tb/in$^2$ or greater (H. Saga, H. Nemoto, H. Sukeda, and M. Takahashi, Jpn. J. Appl. Phys. 38, Part 1, 1839 (1999)). In conventional magnetic recording apparatuses, there is the problem of loss of recorded information due to heat fluctuation as the recording density exceeds 1Tb/in$^2$. In order to prevent this problem, it is necessary to increase the coercive force of the magnetic recording medium. However, since there is a limit to the magnitude of magnetic field that a recording head can produce, it becomes impossible to form a recording bit on the medium if the coercive force is increased too much. To solve this problem, in the thermally assisted magnetic recording, the medium is optically heated to reduce its coercive force at the moment of recording. In this way, it becomes possible to record in a high coercive force medium and to thereby realize recording densities of 1 Tb/in$^2$ or higher.

In such thermally assisted magnetic recording apparatus, the spot size of the irradiating light needs to be on the same order as the size of the recording bit (several tens of nanometers) because larger optical spot sizes would eliminate the information in adjacent tracks. To heat such a microscopic region, optical near-field is used. Optical near-field is a localized electromagnetic field (light of which the wave number includes an imaginary component) that exists near a microscopic object of a size smaller than the wavelength of the light. It is produced by means of a microscopic aperture of a size smaller than the wavelength of the light or a metal scatterer. For example, the Technical Digest of 6th International Conference on Near Field Optics and Related Techniques, the Netherlands, Aug. 27-31, 2000, p. 55 proposes a optical near-field generator that employs a triangular metal scatterer as a high-efficiency optical near-field generator. When the metal scatterer is irradiated with light, plasmon resonance is excited in the metal scatterer, producing strong optical near-field at the apex of the triangle. Use of such optical near-field generator enables a highly efficient collection of light in a region of less than several tens of nanometers.

Non-patent Document 1: Jpn. J. Appl. Phys. 38, Part 1, 1839 (1999)

Non-patent Document 2: Technical Digest of 6th International Conference on Near Field Optics and Related Techniques, the Netherlands, Aug. 27-31, 2000, p. 55

SUMMARY OF THE INVENTION

Higher efficiencies can be obtained by minimizing the spot size of the light incident on the scatterer for producing the aforementioned optical near-field. For if the spot size of the incident light is too large relative to the size of the scatterer, most of the incident light would pass the scatterer without hitting it. Such passing light leads to energy loss and reduced efficiency. Thus, the spot size of the incident light should be reduced as much as possible.

The light incident on the scatterer is preferably guided to the scatterer via a waveguide or a condenser lens. When the incident light is guided by a waveguide, in order to reduce the spot size of the incident light, the difference in refractive index between core and cladding needs to be maximized. It is also necessary to form the core with a material having a high refractive index, such as $Ta_2O_5$, and to embed the scatterer in the core end surface. In a case where the incident light is condensed by a condenser lens, such as a solid immersion lens, and the scatterer is formed where the light is condensed, the refractive index of the material of the lens needs to be increased as much as possible so as to reduce the spot size of the incident light. Namely, it is necessary to form the scatterer in a high refractive index material. However, when the scatterer is formed in a high refractive index material, a large polarization is caused in the high refractive index material, and it to cancel the effect of the charges collecting on the surface of the metal scatterer. As a result, the intensity of the optical near-field that is produced decreases.

It is an object of the invention to provide a means to prevent a reduction in the intensity of optical near-field when an light propagating medium made of a high refractive index material, such as a waveguide or a lens, is used to reduce the spot size of the incident light.

In order to achieve the aforementioned object, in accordance with the invention, a planar and triangular scatterer for producing optical near-field is formed on the bottom surface of a slider, and a waveguide for introducing light is formed on top of the scatterer. The portions near the scatterer under the waveguide are covered with a material different from the material of the core of the waveguide. The refractive index of the different material is smaller than the refractive index of the core of the waveguide. The "portions under the waveguide" herein refer to portions near the bottom surface of the slider. By thus reducing the refractive index of the material of the portions near the scatterer where optical near-field is produced, it becomes possible to reduce the magnitude of polarization that develops in the material near the scatterer. As a result, the optical near-field intensity in the scatterer can be increased.

Preferably, the thickness of the low refractive index portion (distance from the interface of the waveguide core and the low refractive index portion to the surface of the low refractive index portion on the opposite side from the waveguide core) is greater than the thickness of the scatterer so that the waveguide core portion does not come into contact with the scatterer. Conversely, if the thickness of the low refractive index portion is too much, the incident light widens. Therefore, the thickness of the low refractive index portion is preferably smaller than the wavelength of the light that propagates in the low refractive index portion.

Further preferably, the thickness of the low-refractive index portion is set such that the intensity of the reflected light that returns into the waveguide is minimized. When the slider is brought near the surface of a medium, the light reflected by the interface of the waveguide core and the low refractive index portion, the light reflected by the slider surface, and the light reflected by the medium surface interfere with one another. Thus, by setting the thickness of the low refractive index portion such that the lights that travel in the direction back to the waveguide cancel one another, the reflected light that returns into the waveguide can be reduced. When the intensity of the reflected light is thus minimized, the light travels back and forth inside the low refractive index portion (i.e., it is contained within the low refractive index portion). This means that the amount of light that becomes incident on the scatterer increases, whereby the intensity of optical near-field that is produced near the scatterer can be increased.

The light propagating medium may consist of a lens such as a solid immersion lens, instead of a waveguide. The scatterer is installed at a position where the light from the lens surface is collected, and the portions near the scatterer are covered with a material having a refractive index smaller than the refractive index of the lens. In order to suppress the widening of the optical spot size on the low refractive index material portion, the thickness of the low refractive index material portion is preferably smaller than the wavelength of the light in the low refractive index material portion.

The scatterer may be planar-circular, elliptical, rectangular solid, spherical, or the like, instead of planar-triangular. A light-blocking film may be formed near the scatterer. The scatterer may be partly joined with such light-blocking film to form a V- or C-shaped opening.

When an light propagating medium, such as a waveguide or a lens, of a high refractive index material is combined with a scatterer for producing optical near-field, the decrease in the optical near-field intensity can be prevented.

BRIEF DESCRIPTION OF THE DRAWINGS

FIG. 8A shows an example in which the film thickness of a center portion has become greater; FIG. 8B shows an example in which the film thickness of a center portion has become greater.

DESCRIPTION OF THE PREFERRED EMBODIMENTS

In the following, examples of the invention are described with reference to the drawings.

EXAMPLE 1

Initially, a case where a waveguide is used as a means to transmit incident light to a optical near-field element is described.

Figure 1:
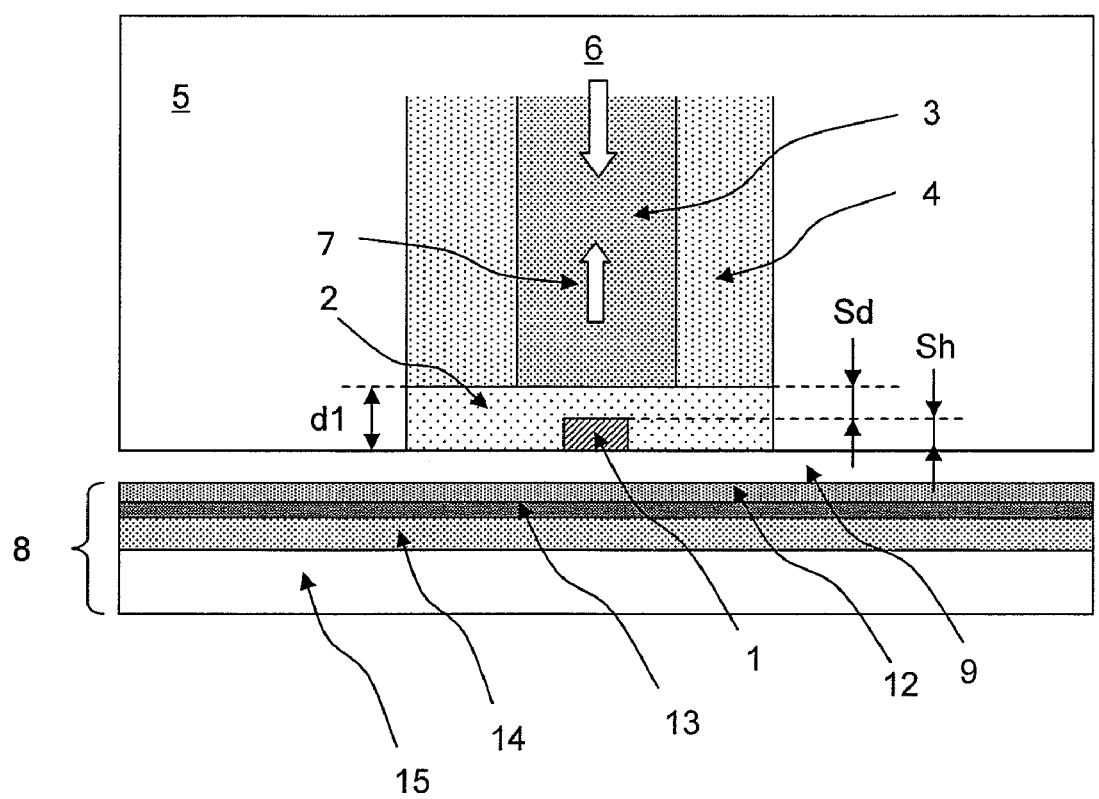
FIG. 1 shows a side cross-section of a optical near-field generator of the invention.
Figure 2:
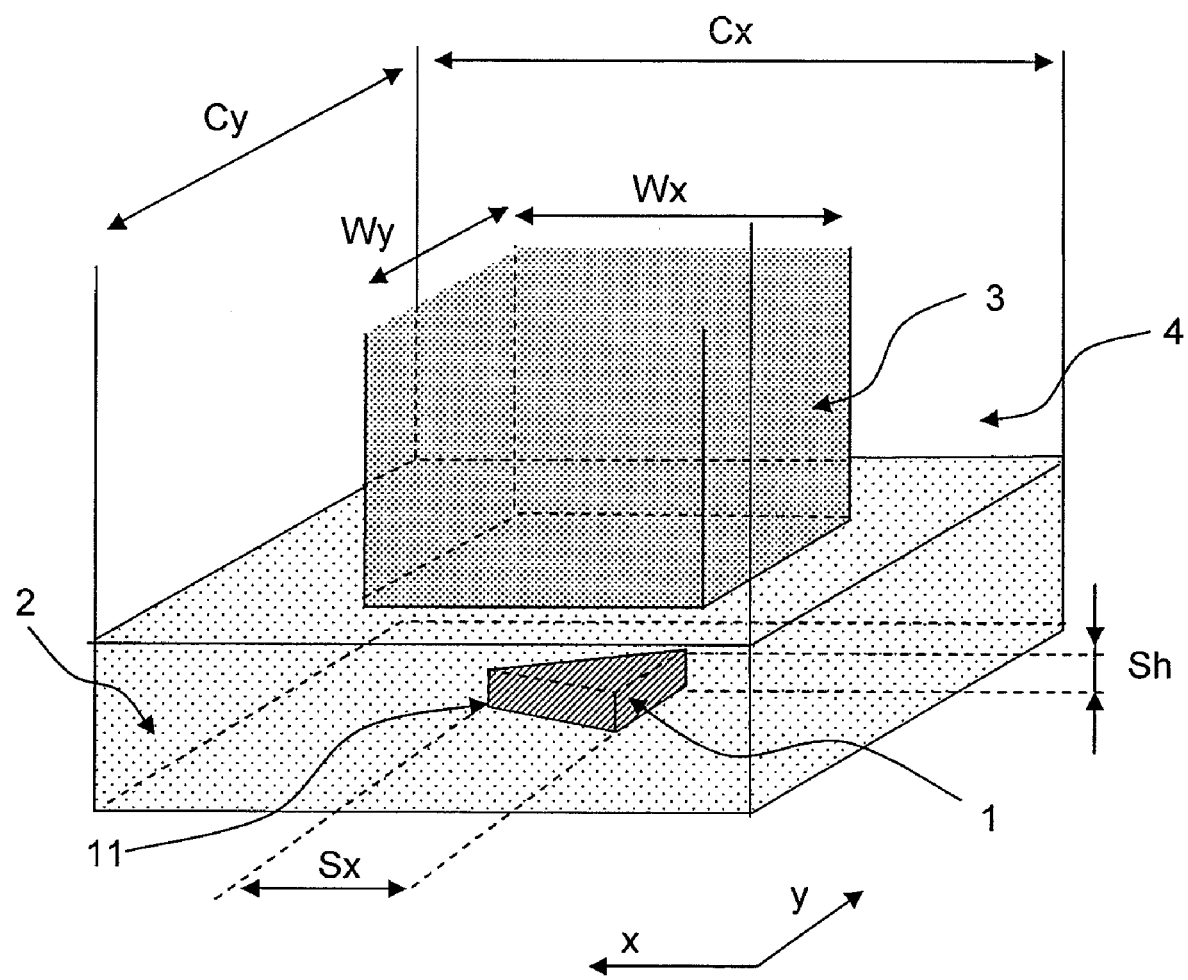
FIG. 2 shows a perspective view of the optical near-field generator of the invention.

FIGS. 1 and 2 show an example of a head for a thermally assisted magnetic recording apparatus using a waveguide. In a slider 5, which constitutes a base for the head, a waveguide (composed of a core 3 and a cladding 4) for guiding light to a optical near-field generating element was formed. Below the waveguide, a scatterer 1 for producing optical near-field was formed. The material of the core 3 of the waveguide was $Ta_2O_5$ (refractive index=2.18), and the material of the cladding was $SiO_2$. The waveguide had a square cross-section, with its widths Wx and Wy both measuring 500 nm. The cladding also had a square cross-section, with the widths Cx and Cy both measuring 1.0 μm.

As shown in FIG. 2, the scatterer 1 had a planar triangular shape, and its material was gold. The length Sx was 100 nm; thickness Sh was 50 nm; and the apex angle of an apex 11, at which optical near-field was produced, was 60°. The portion 2 around the scatterer 1 was covered with a material having a refractive index smaller than the refractive index of the core 3. By thus covering only the portion around the scatterer with a material having a small refractive index, it becomes possible to reduce the magnitude of polarization caused in the medium near the optical near-field generating element, thus preventing a reduction in the optical near-field intensity. In the present example, the material of the surrounding portion 2 of the scatterer 1 was $SiO_2$ (refractive index=1.45).

It is necessary that the thickness d1 of the low refractive index portion 2 be larger than the thickness Sh of the scatterer 1. If d1 is smaller than Sh, the scatterer would be partly in contact with the waveguide core portion 3 with a high refractive index, thus reducing the optical near-field intensity. On the other hand, if the thickness d1 of the low refractive index portion 2 is too large, the light would widen as it emerges from the waveguide (where the portion where core 3 and low refractive index portion 2 meet) and arrives at the scatterer 1, resulting in reduced efficiency.

Figure 3:
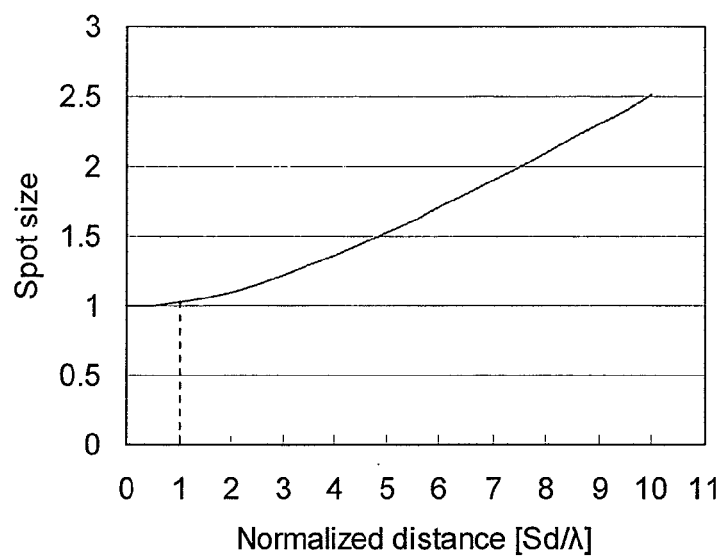
FIG. 3 shows the relationship between the distance from an end surface of a waveguide core and the spot size.

FIG. 3 shows the relationship between the distance Sd from the interface of the waveguide core portion 3 and the low refractive index portion 2 to the scatterer 1 and the spot size. The distance Sd was standardized by the wavelength within the low refractive index portion (Sd/λ, where λ is the wavelength of the light that propagates within the low refractive index portion). The spot size was standardized by the spot size when Sd=0. As shown in FIG. 3, there was hardly any widening of the spot size as long as the distance Sd was shorter than the wavelength within the low refractive index portion. Thus, the distance Sd should preferably be made smaller than the wavelength within the low refractive index portion.

At the interface of the low refractive index portion 2 and the waveguide core 3, the light is reflected, producing reflected light 7 that propagates in the waveguide core 3 in the opposite direction. Any such reflected light returning to the waveguide causes a laser noise. When the interface of the low refractive index portion 2 and the core 3 of the waveguide is planar, the amount of the reflected light 7 can be reduced by optimizing the thickness d1 of the low refractive index portion 2. Specifically, the thickness d1 of the low refractive index portion 2 should be set such that the reflected light 7 is minimized by the interference of the light reflected by the interface of the core 3 and the low refractive index portion 2, the light reflected by the slider surface, and the light reflected by the medium surface. Under such conditions, the light travels back and forth within the low refractive index portion 2 (i.e., it is confined in the low refractive index portion 2). This amounts to an increase in the amount of light incident on the scatterer 1, leading to an increase in the intensity of the optical near-field produced near the scatterer.

The amount of the reflected light 7 in the above example is calculated below. Table 1 shows the thickness and refractive index (complex number) of the waveguide core 3, low refractive index portion 2, air gap 9, overcoat 12, recording layer 13, medium underlayer 14, and medium substrate 15. When the dielectric constant, magnetic permeability, and wave number in vacuum are denoted as $\epsilon_0$, $\mu_0$, $k_0$, respectively, the ratio of the intensity of the reflected light 7 to the intensity of the incident light 6 (reflectivity) R is expressed by the following expression:

TABLE 1

|  | Thickness | Refractive index |
|---|---|---|
| Core |  | $n_0$ |
| Low refractive index region | $d_1$ | $n_1$ |
| Air gap | $d_2$ | $n_2$ |
| Overcoat | $d_3$ | $n_3$ |
| Recording layer | $d_4$ | $n_4$ |
| Underlayer | $d_5$ | $n_5$ |
| Substrate |  | $n_s$ |

$$R = \left| \frac{Y_0 m_{11} + Y_0 Y_s m_{12} - m_{12} - Y_s m_{22}}{Y_0 m_{11} + Y_0 Y_s m_{12} + m_{12} + Y_s m_{22}} \right|^2$$

wherein:

$$Y_0 = \sqrt{\frac{\epsilon_0}{\mu_0}} n_0$$

$$Y_s = \sqrt{\frac{\epsilon_0}{\mu_0}} n_s$$

$$\begin{bmatrix} m_{11} & m_{12} \\ m_{21} & m_{22} \end{bmatrix} = M_1 M_2 M_3 M_4 M_5$$

$$M_i = \begin{bmatrix} \cos k_0 n_i d_i & (i \sin k_0 n_i d_i) / \left( \sqrt{\frac{\epsilon_0}{\mu_0}} n_i \right) \\ \sqrt{\frac{\epsilon_0}{\mu_0}} n_i i \sin k_0 n_i d_i & \cos k_0 n_i d_i \end{bmatrix} (i = 1, 2 \ldots 5)$$

where i is an imaginary unit and $M_i$ is a matrix referred to as a characteristic matrix that indicates the characteristics of each layer.

Figure 4:
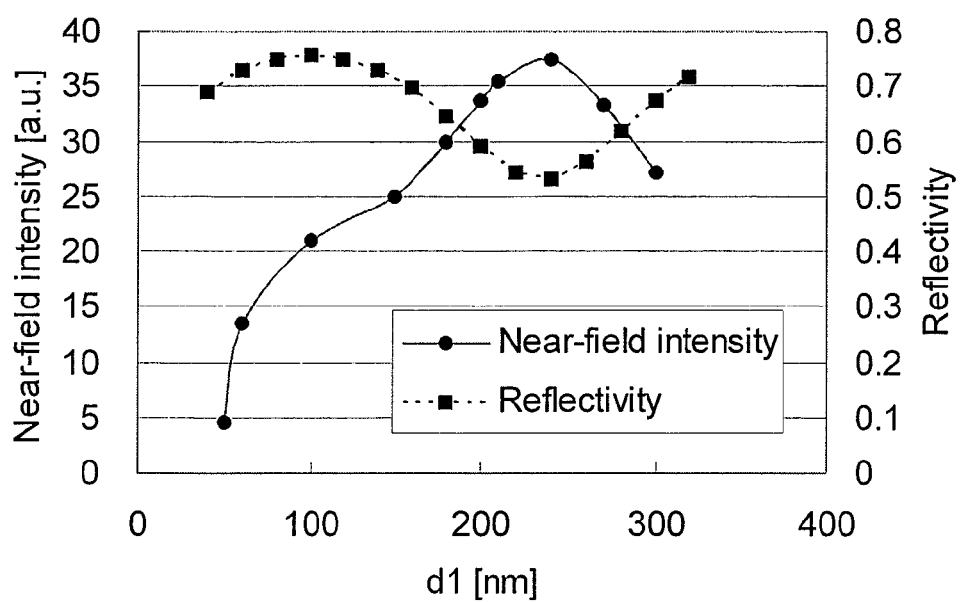
FIG. 4 shows the relationship among the thickness of the low refractive index portion, reflectivity, and optical near-field intensity.

FIG. 4 shows the relationship between the reflectivity R calculated by the above expression and the optical near-field intensity, where the optical near-field intensity was calculated by the finite difference time domain (FDTD) method. In these calculations, it was assumed that the slider was placed on the surface of the magnetic recording medium 8; that the air gap thickness between the slider and the medium was 8 nm; and that the magnetic recording medium 8 was composed of an overcoat 12 (of SiN) with a thickness 2 nm, a recording layer 13 (of Co/Pd) with a thickness 6 nm, and a metal layer 14 (of gold) formed therebelow with a thickness 30 nm. The metal layer 14 functions to increase the optical near-field intensity (by the excitation of a mirror image of a charge in the scatterer in the metal layer 14, resulting in an interaction of the charge of the mirror image with the charge in the scatterer), as well as acting as a heat sink layer for preventing the increase in the size of the recording mark due to thermal diffusion. The medium substrate 15 was made of glass.

As shown in this figure, the reflectivity R is minimum and the optical near-field intensity becomes maximum when the thickness d1 of the low refractive index portion 2 ($SiO_2$) is approximately 240 nm. Thus, in the present example, the thickness d1 was set at 240 nm. While in the above calculation the medium was described as being composed of an overcoat, a recording layer, and an underlayer, additional layers may be added in order to obtain better medium characteristics. In such a case, a characteristic matrix $M_i$ corresponding to the added layer should be added.

Figure 5:
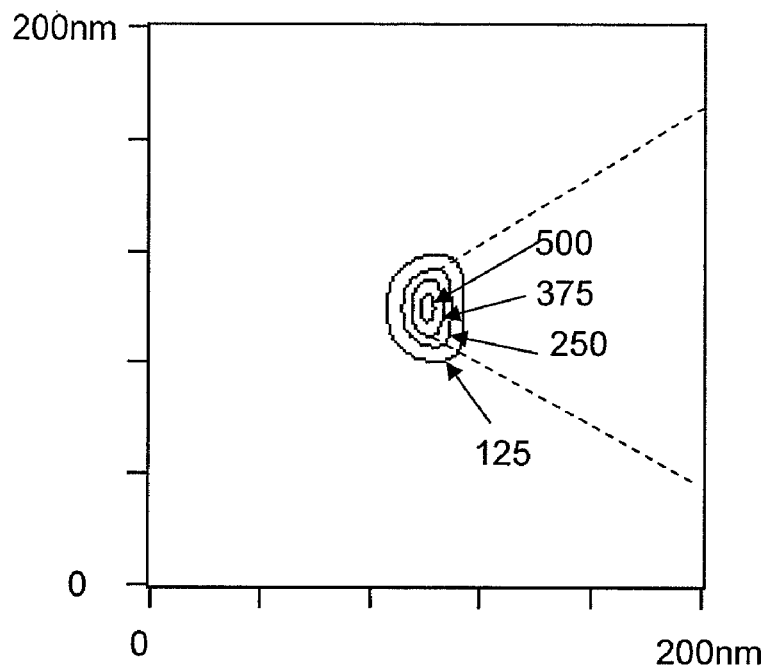
FIGS. 5A and 5B show optical near-field intensity distributions in a case where no low refractive index portion was provided (FIG. 5A) and in a case where a low refractive index portion was provided (FIG. 5B).
Figure 5:
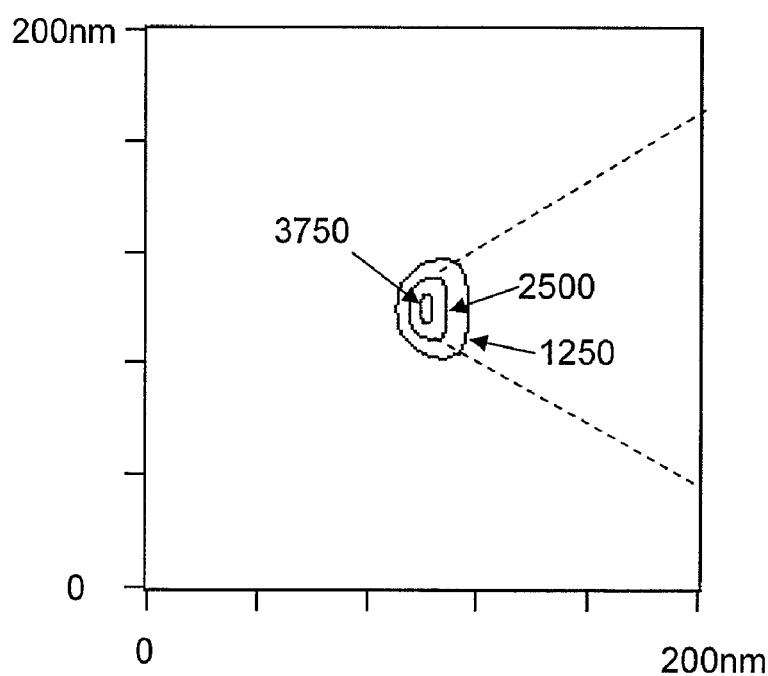

FIGS. 5A and 5B show the optical near-field intensity distributions in a case where the low refractive index portion 2 with thickness d1 of 240 nm was provided and another case where the low refractive index portion 2 was not provided. When the low refractive index portion was not provided, the material around the scatterer 1 was $Ta_2O_5$ (When the portion around the scatterer is $Ta_2O_5$, the plasmon resonance conditions vary and the optimum value of the length Sx of the scatterer also varies. In the present calculations, the length Sx was set at 80 nm so as to obtained the maximum optical near-field intensity). FIG. 5A shows the case where the low refractive index portion was not provided; FIG. 5B shows the case where the low refractive index was provided. The intensity value indicates its ratio to the incident light intensity. The peak intensity was 540 times the incident light intensity when the low refractive index portion was not provided; it was 3980 times when the low refractive index portion was provided. Thus, the optical near-field intensity could be increased by 7.3 times by providing the low refractive index portion.

In the foregoing example, the shape of the scatterer was planar-triangular. The shape of the scatterer, however, may be planar-circular, elliptical, rectangular solid, spherical, and so on. The surface of the scatterer may partly be shaved, as shown in JP Patent Publication (Kokai) No. 2004-151046 A, for example. The material of the scatterer is not limited as long as it is electrically conductive; it may be a metal such as silver, copper, aluminum, iron, nickel, or an alloy thereof, or a semiconductor such as Si.

In the foregoing example, the cross section of the waveguide was square; it may be, however, rectangular, circular, or elliptical, for example. The material of the low refractive index portion 2 around the scatterer is not limited as long as its refractive index is smaller than the refractive index of the material of the core 3. When the material of the core 3 is $Ta_2O_5$, the material of the low refractive index portion 2 may be a dielectric, such as $Al_2O_3$ (refractive index=1.63), $MgF_2$ (refractive index=1.38), or the like. The material of the core 3 may be Si, and the material of the low refractive index portion 2 may be a dielectric, such as $SiO_2$ (refractive index=1.45), $Al_2O_3$ (refractive index=1.63), or $MgF_2$ (refractive index=1.38), for example (where the wavelength is made 1 μm or longer so as to prevent optical absorption by Si).

Figure 6:
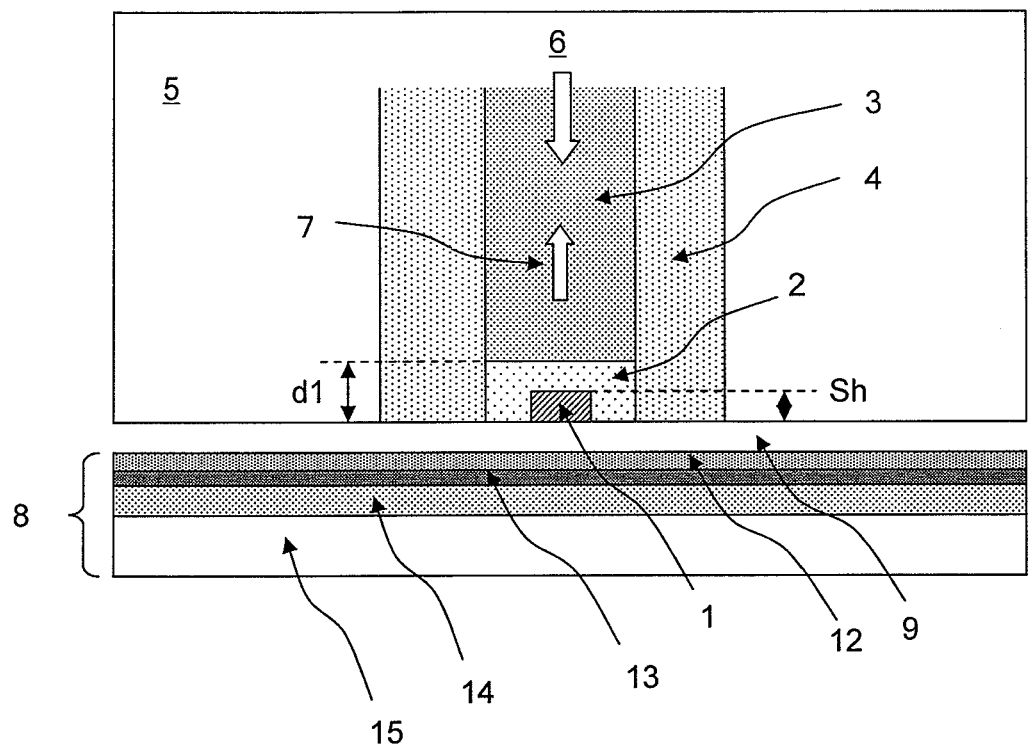
FIG. 6 shows an example in which a waveguide cladding portion extends to a slider bottom surface.

In the foregoing example, the low refractive index portion 2 was formed under the cladding portion 4 of the waveguide as well; however, as shown in FIG. 6, it may be formed under the core portion 3 alone, such that the cladding portion 4 is in contact with the slider bottom surface. In this case, the refractive index of the cladding 4 is preferably made smaller than the refractive index of the low refractive index portion 2. By thus making the refractive index of the cladding 4 smaller than the refractive index of the low refractive index portion 2, the widening of the optical spot, which occurs before it travels the distance from the interface of the waveguide core 3 and the low refractive index portion 2 to the scatterer 1, can be reduced. In the present example, the material of the core portion 3 was $Ta_2O_5$, the material of the cladding portion 4 was $MgF_2$, and the material of the low refractive index portion 2 was $SiO_2$.

Figure 7:
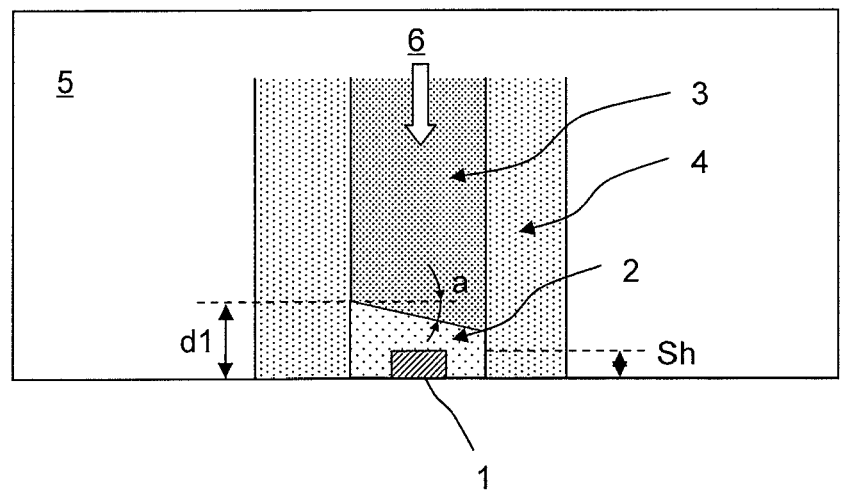
FIG. 7 shows an example in which the interface of the waveguide core and the low refractive index material portion is inclined.

In the above example, the interface of the low refractive index portion 2 and the core 3 of the waveguide was described as being parallel to the bottom surface of the slider. Alternatively, the interface may be inclined as shown in FIG. 7, so as to prevent the reflected light at the interface from returning to the core 3 of the waveguide. In the present example, the thickness d1 of the low refractive index portion 2 was 100 nm, and the angle a between the interface and the slider surface was 5°.

Figure 8:
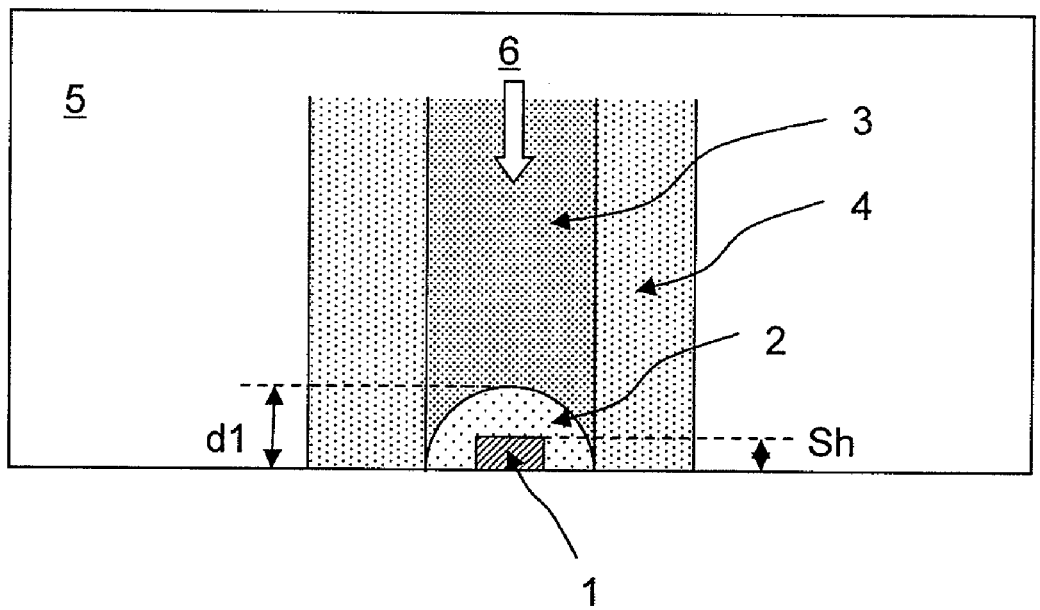
FIGS. 8A and 8B show examples in which the interface of the waveguide core and the low refractive index material portion is curved.
Figure 8:
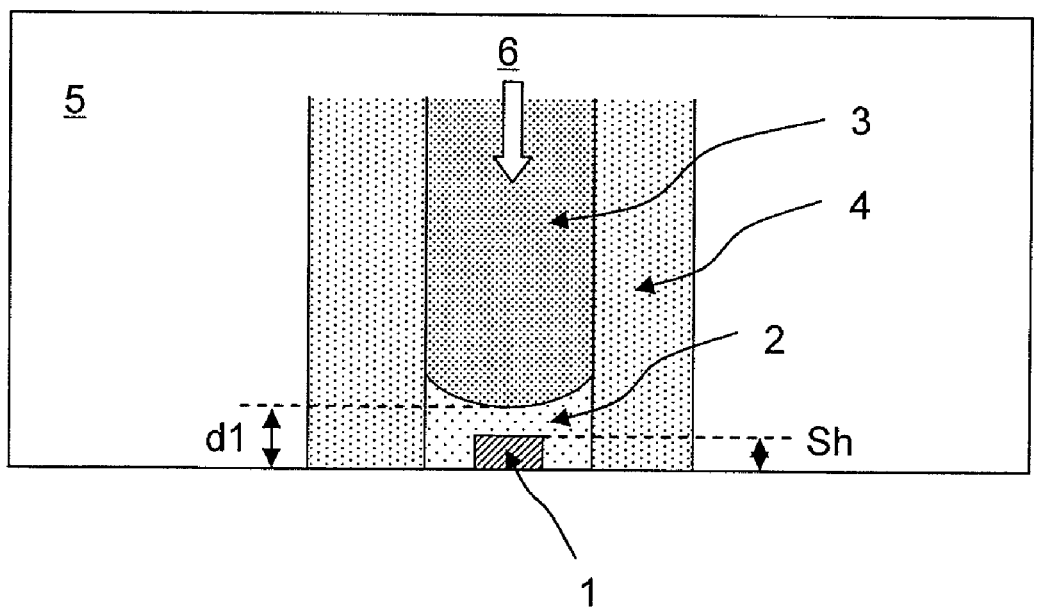

In the foregoing example, the interface of the low refractive index portion 2 and the core 3 of the waveguide was described as being planar. It may, however, be curved, as shown in FIGS. 8A and 8B. In this way, it becomes possible to prevent the reflected light produced at the interface between the low refractive index portion 2 and the core 3 of the waveguide from returning to the core 3. The widening of the outgoing light can be reduced by extending the center of the interface downward as shown in FIG. 8B, thus making the interface function as a lens.

Figure 9:
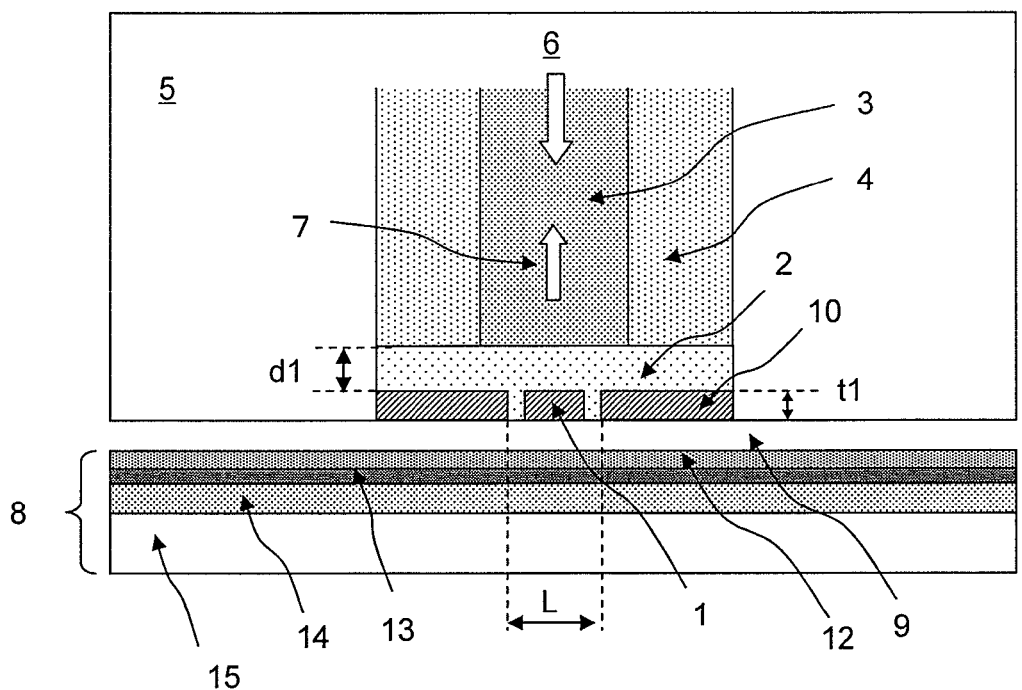
FIG. 9 shows an example in which a light-blocking film is formed near the scatterer.

In order to prevent the background light present around the scatterer 1 from becoming incident on the medium, a light-blocking film 10 may be formed around the scatterer 1, as shown in FIG. 9. In this case, when determining the optimum value of the thickness of the low refractive index portion 2, it is necessary to take the influence of the light-blocking film 10 into consideration. Specifically, when the refractive index of the light-blocking film is $n_s$ and the thickness is $t_1$, its characteristic matrix $M_s$ is expressed by the following:

$$M_s = \begin{bmatrix} \cos k_0 n_s t_1 & (i \sin k_0 n_s t_1) / \left( \sqrt{\frac{\varepsilon_0}{\mu_0}} n_s \right) \\ \sqrt{\frac{\varepsilon_0}{\mu_0}} n_s i \sin k_0 n_s t_1 & \cos k_0 n_s t_1 \end{bmatrix}$$

This characteristic matrix is incorporated into the above mathematical expression, so that we have:

$$\begin{bmatrix} m_{11} & m_{12} \\ m_{21} & m_{22} \end{bmatrix} = M_1 M_s M_2 M_3 M_4 M_5$$

Reflectivity R is calculated from the above expressions using this matrix in order to find an optimum value of the thickness of the low refractive index portion 2.

Figure 10:
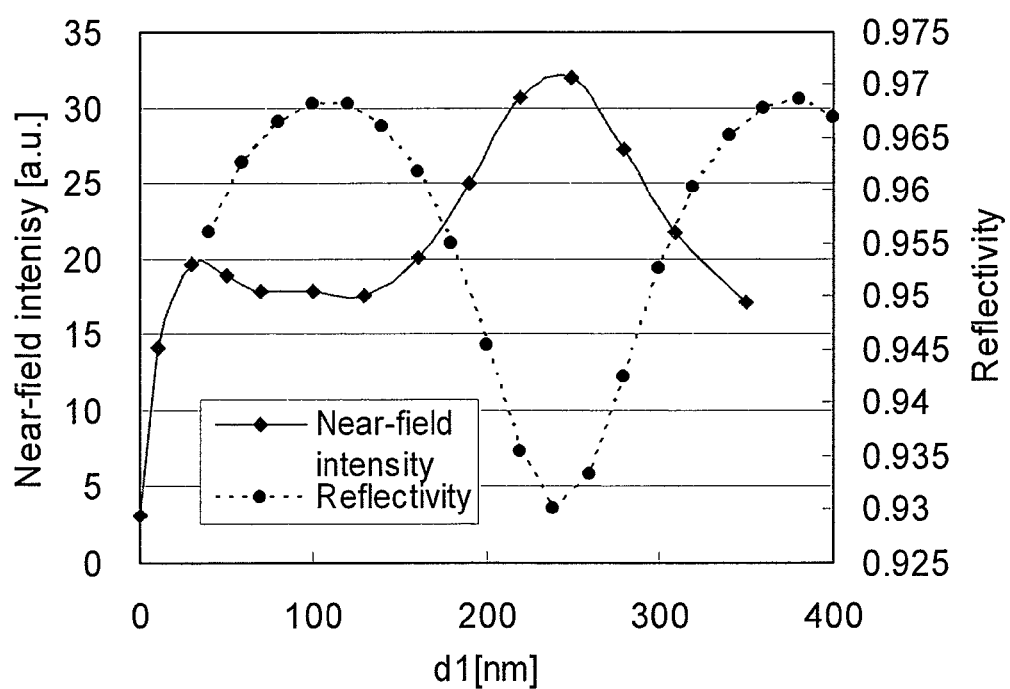
FIG. 10 shows the relationship between the thickness of the low refractive index portion and the optical near-field intensity in a case where a light-blocking film is formed near the scatterer.

FIG. 10 shows the relationship among the thickness d1 of the low refractive index portion 2, reflectivity, and optical near-field intensity in a case where the light-blocking film 10 was formed. In the present example, the shape and material of the scatterer, the shape and material of the waveguide, and the material of the low refractive index portion were the same as those of the foregoing example. The material of the light-blocking film was gold; the thickness t1 was 50 nm; and the diameter L of the opening was 140 nm. As shown in the figure, the reflectivity became minimized and the optical near-field intensity became maximized when the thickness d1 of the low refractive index portion 2 was approximately 240 nm.

In the above light-blocking film, there is an opening around the scatterer 1. When the diameter of the opening is close to the spot size of the incident light, the optimum value of the thickness d1 of the low refractive index portion 2 could possibly differ from an optimum value determined from the above method using the characteristic matrix. In such a case, the optimum value needs to be determined from a strict calculation by the FDTD method, for example.

In the foregoing example, it has been described that the metal scatterer is separate from the light-blocking film. The scatterer, however, may be partly connected to the light-blocking film in such a manner as to form a V-shaped opening (JP Patent Publication (Kokai) No. 2001-255254 A) or a C-shaped opening (Optics Letters, Vol. 28, No. 15, Aug. 1, 2003, page 1320), for example.

EXAMPLE 2

In the following, an example is described in which a lens is used as the means to transmit the incident light to the optical near-field element.

Figure 11:
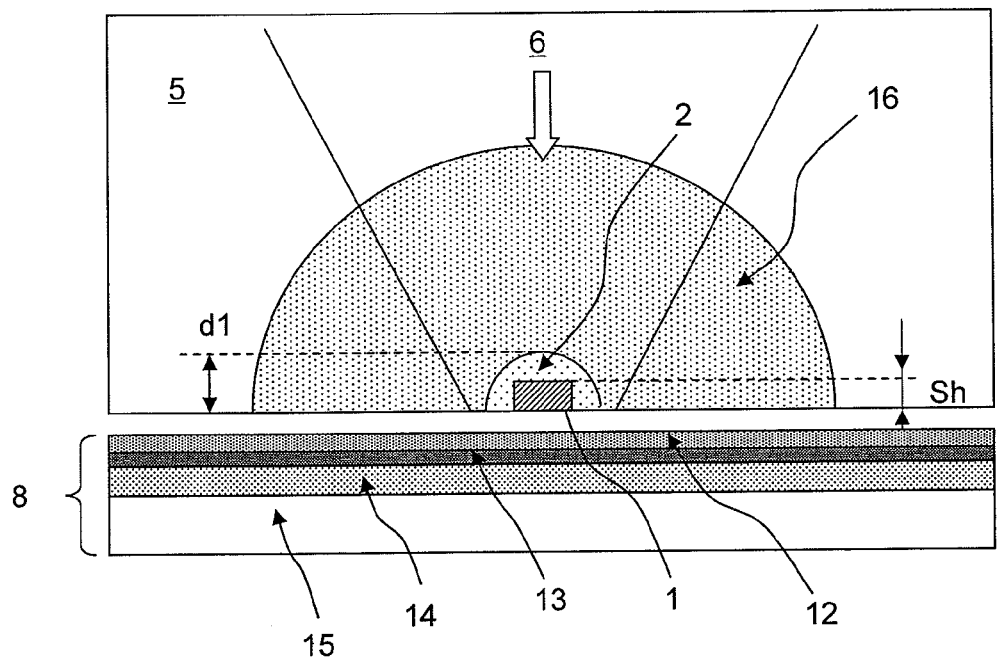
FIG. 11 shows an example involving a condenser lens, in which the shape of the low refractive index material portion hemispheric.

FIG. 11 shows the example in which a lens is used. In the present example, the lens consisted of a hemispheric lens 16 made of $Bi_4Ge_3O_{12}$ (refractive index=2.23). The lens 16 was formed on the bottom surface of the slider 5, and the incident light 6 was caused to become incident on the lens such that the light is collected at the bottom surface of the hemispheric lens. The scatterer 1 was formed at the focal position on the bottom surface of the lens. The shape and material of the scatterer were the same as in the foregoing example. Around the scatterer 1, a hemispheric low refractive index portion 2 was formed of $SiO_2$. It is necessary to reduce the thickness d1 of the low refractive index portion 2 but only to such an extent that the light-collecting characteristics of the lens do not deteriorate. For that purpose, the thickness d1 of the low refractive index portion 2 needs to be not greater than the optical wavelength in the lens ($\lambda_0/n_L$, where $\lambda_0$ is the wavelength in vacuum and $n_L$ is the refractive index of the lens). In the present example, d1 was 250 nm.

Figure 12:
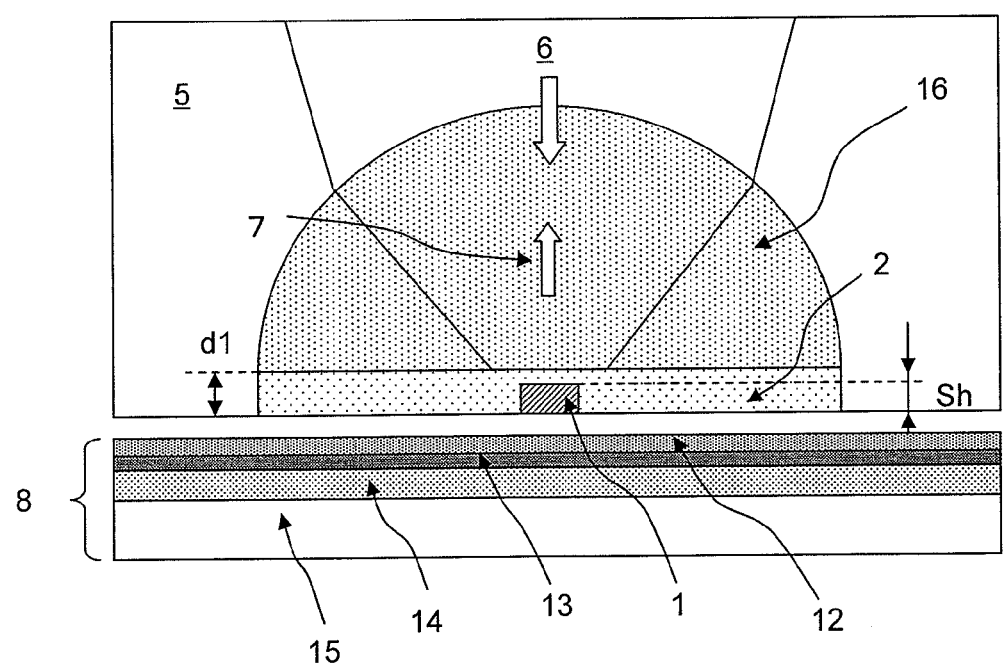
FIG. 12 shows an example involving a condenser lens, in which the low refractive index material portion is formed as a thin film.

The low refractive index portion 2 may consist of a film formed on the bottom surface of the lens, as shown in FIG. 12. In this case, the thickness d1 of the low refractive index portion 2 is preferably made smaller than the wavelength in the low-refractive index medium, as in the case of the example involving a waveguide, so as to suppress the widening of the incident light. Further, d1 is preferably optimized in consideration of the interference of the reflected light from the interface of the low refractive index portion and the core portion, the reflected light from the slider bottom surface, and the reflected light from the medium surface, so as to minimize the return light 7. In the present example, the thickness d1 was 240 nm.

EXAMPLE 3

In the following, an example is described in which the optical near-field generator of the invention is combined with a single-pole head that is used in magnetic disc drives.

Figure 13:
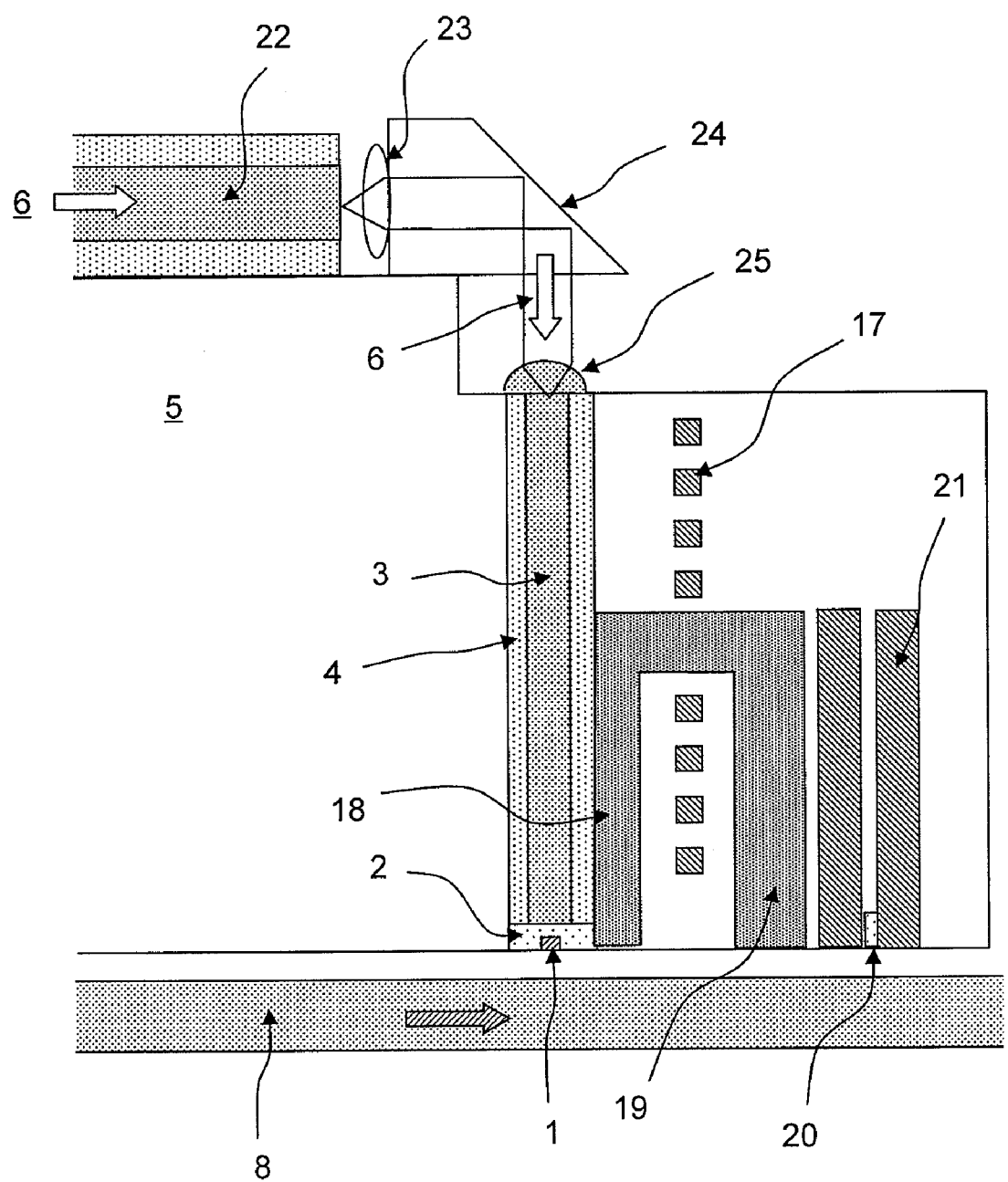
FIG. 13 shows an example combining a scatterer and a single-pole head for magnetic recording equipment.

FIG. 13 shows a cross section of a recording head combining a single-pole head and a scatterer. On the surface of the slider 5, the scatterer 1 for producing optical near-field was formed, around which the low refractive index portion 2 was formed. Light was produced by a semiconductor laser with a wavelength 785 nm. The light emitted by the semiconductor laser was guided via a waveguide 22 to the slider 5. The light emerging from the waveguide 22 was collimated into parallel light by collimating lens 23. The light was folded by a mirror 24 and then coupled to a waveguide (consisting of a core 3 and a cladding 4) via a condenser lens 25, the waveguide connecting to the optical near-field generating element. A magnetic field was produced by a thin-film coil 17 and guided by a main magnetic pole 18 to near the scatterer 1. On the opposite side of the thin-film coil 17, a return pole 19 for forming a closed magnetic path was formed. To the side of the waveguide, a magnetic reproduction element (giant magneto resistive (GMR) element or a tunneling magneto resistive (TMR) element) 20 for reproducing a recording mark was formed. Around the magnetic reproduction element 20, a shield 21 for blocking the surrounding magnetic field was formed.

Figure 14:
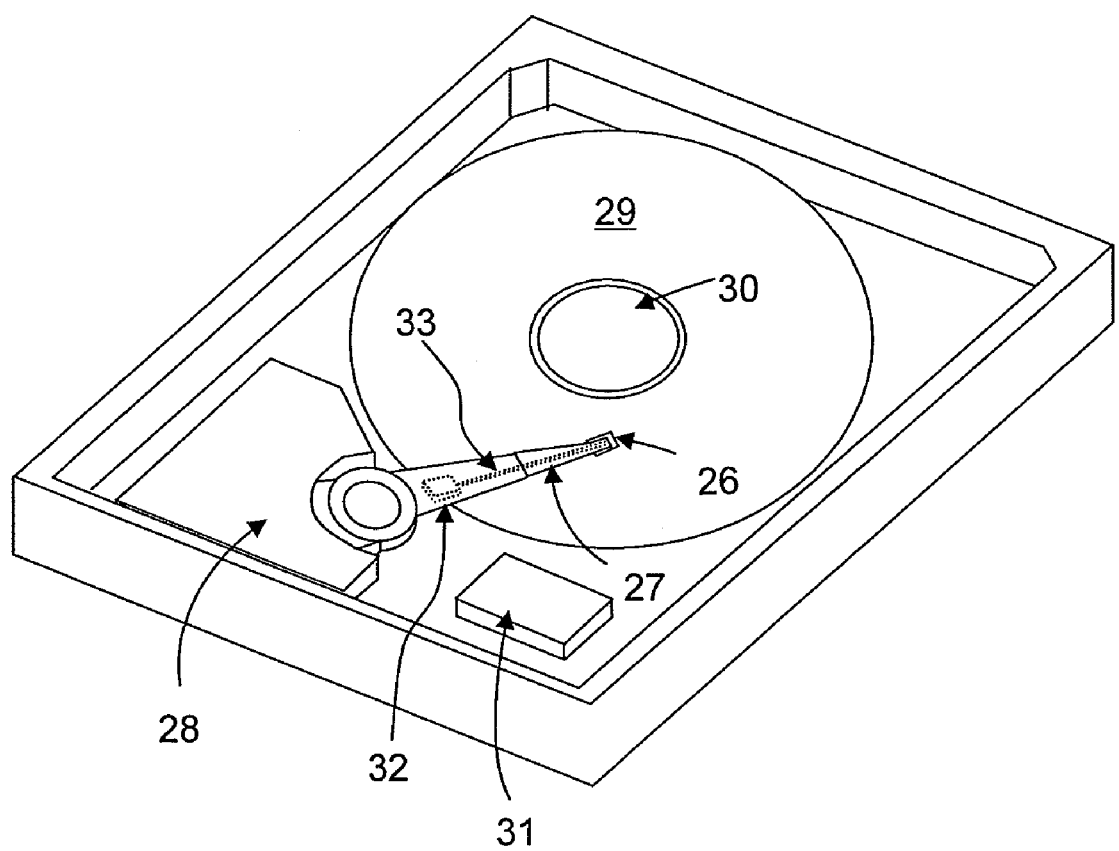
FIG. 14 shows an example of the configuration of a recording and reproduction apparatus.

FIG. 14 shows an example in which the above recording head was applied to a thermally assisted magnetic recording apparatus. The recording head 26 of the invention was fixed to a suspension 27, and the position of the head was moved by a voice coil motor 28. On the surface of the head, an air bearing surface was formed, which was floated above the recording disc 29 by a flying height of not more than 10 nm. As a recording disc 29, a magnetic recording medium was used. The recording disc 29 was fixed to a spindle 30 which was rotated by a motor. At the moment of recording, a magnetic field was produced by the coil provided in the recording head 26, while simultaneously the semiconductor laser was caused to emit light, with which a recording mark was formed. The semiconductor laser was disposed inside a thin package 32 located at the base of the suspension 27, from which the light was guided by the waveguide 33 to the slider. For reproduction, the magnetic reproduction element 20 formed on the surface of the slider was used. The reproduction signal was processed in a signal processing LSI 31.

In the foregoing example, the recording medium consisted of a magnetic medium; it may consist, however, of a phase-change medium, a photochromic medium, or the like. In these cases, a change in the intensity of scattered light produced by the scatterer 1, which produces optical near-field, may be detected, instead of using the magnetic reproduction element 20 as the reproducing element. The scattered light produced by the scatterer 1 travels through the waveguide or lens used for the entry of light, in the direction back to the light source. Therefore, the return light was separated by a beam splitter inserted in the optical path of the incident light and then detected by a photodetector.

The above optical near-field generator may be used in a scanning near-field optical microscope as well as in an information recording and reproduction apparatus. The above optical near-field generator may also be used as a biosensor. For example, when a molecule that reacts with a particular substance called a ligand is adsorbed on the scatterer surface, the refractive index around the scatterer varies upon adsorption of an analyte on the ligand, causing a change in the intensity of the scattered light produced by the scatterer. By monitoring such intensity changes, it becomes possible to detect the presence or absence of the analyte.

What is claimed is:

1. An optical near-field generator comprising:
   a first light propagating medium propagating light to a second light propagating medium disposed in contact with the first light propagating medium and surrounding a structure that is irradiated with light;
   wherein the structure is irradiated with light via the second light propagating medium to produce optical near-field; and
   wherein the refractive index of the second light propagating medium is smaller than the refractive index of the first light propagating medium.

2. The optical near-field generator according to claim 1, wherein the first light propagating medium comprises a core of a waveguide.

3. The optical near-field generator according to claim 1, wherein the first light propagating medium comprises a condenser lens.

4. The optical near-field generator according to claim 1, wherein the structure comprises an electrically conductive scatterer.

5. The optical near-field generator according to claim 1, wherein the distance from the interface of the first light propagating medium and the second light propagating medium to a surface of the second light propagating medium opposite to the first light propagating medium is smaller than the wavelength of the light traveling in the second light propagating medium.

6. The optical near-field generator according to claim 1, wherein the distance from the interface of the first light propagating medium and the second light propagating medium to a plane of the structure opposite to the first light propagating medium is set such that the intensity of reflected light returning to the first light propagating medium is minimized.

* * * * *